United States Patent
Heaton et al.

(10) Patent No.: US 11,559,787 B2
(45) Date of Patent: Jan. 24, 2023

(54) COMPOSITIONS, METHODS, AND APPARATUSES FOR CATALYTIC COMBUSTION

(71) Applicant: STAR SCIENTIFIC LIMITED, Gordon (AU)

(72) Inventors: Steven James Heaton, Mayfield West (AU); Samuel James Kirk, Mayfield West (AU)

(73) Assignee: STAR SCIENTIFIC LIMITED, Gordon (AU)

( * ) Notice: Subject to any disclaimer, the term of this patent is extended or adjusted under 35 U.S.C. 154(b) by 81 days.

(21) Appl. No.: 16/641,439

(22) PCT Filed: Aug. 22, 2018

(86) PCT No.: PCT/AU2018/050895
§ 371 (c)(1),
(2) Date: Feb. 24, 2020

(87) PCT Pub. No.: WO2019/036762
PCT Pub. Date: Feb. 28, 2019

(65) Prior Publication Data
US 2020/0197913 A1  Jun. 25, 2020

Related U.S. Application Data

(60) Provisional application No. 62/549,816, filed on Aug. 24, 2017.

(51) Int. Cl.
*B01J 23/44* (2006.01)
*B01J 23/14* (2006.01)
(Continued)

(52) U.S. Cl.
CPC ............. *B01J 23/44* (2013.01); *B01J 23/14* (2013.01); *B01J 35/002* (2013.01); *B01J 37/348* (2013.01);
(Continued)

(58) Field of Classification Search
None
See application file for complete search history.

(56) References Cited

U.S. PATENT DOCUMENTS

| 4,302,360 A | 11/1981 | Haruta et al. |
| 6,109,018 A | 8/2000 | Rostrup-Nielsen et al. |

(Continued)

FOREIGN PATENT DOCUMENTS

| CN | 101491759 | 7/2009 |
| CN | 101992085 | 3/2011 |

(Continued)

OTHER PUBLICATIONS

Machine translation of CN 104475088 A (Year: 2015).*
(Continued)

*Primary Examiner* — Coris Fung
*Assistant Examiner* — Keling Zhang
(74) *Attorney, Agent, or Firm* — Norton Rose Fulbright US LLP

(57) ABSTRACT

There is provided a catalyst composition including a hydrogen oxidation catalyst and an oxygen reduction catalyst and a process for applying the catalyst composition to a substrate. Heat exchange reactors including the catalyst composition and methods for heating a heat exchange medium are also provided. Catalytic combustors including a catalytic surface including the catalyst composition are further provided. The catalyst is adapted for low temperature activation of a hydrogen combustion reaction.

39 Claims, 9 Drawing Sheets

(51) Int. Cl.
  *B01J 35/00* (2006.01)
  *B01J 37/34* (2006.01)
  *F23C 13/02* (2006.01)
  *F23C 13/08* (2006.01)

(52) U.S. Cl.
  CPC .............. *F23C 13/02* (2013.01); *F23C 13/08* (2013.01); *F23C 2900/13001* (2013.01)

(56) References Cited

U.S. PATENT DOCUMENTS

| | | |
|---|---|---|
| 6,284,210 B1 | 9/2001 | Euzen et al. |
| 7,691,341 B2 | 4/2010 | Campbell et al. |
| 2004/0152584 A1 | 8/2004 | Ou et al. |
| 2006/0063062 A1 | 3/2006 | Zhou et al. |
| 2010/0177462 A1 | 7/2010 | Adzic et al. |

FOREIGN PATENT DOCUMENTS

| | | |
|---|---|---|
| CN | 102427878 | 4/2012 |
| CN | 104475088 | 4/2015 |
| EP | 0087808 | 9/1983 |
| WO | WO 2004/071656 | 8/2004 |
| WO | WO 2007/047374 | 4/2007 |
| WO | WO 2014/074457 | 5/2014 |

OTHER PUBLICATIONS

International Search Report and Written Opinion Issued in Corresponding PCT Patent Application No. PCT/AU2018/050895, dated Oct. 12, 2018.
International Preliminary Report on Patentability Issued in Corresponding PCT Patent Application. No. PCT/AU2018/050895, dated Dec. 23, 2019.
Partial Supplemental European Search Report for EP 18848444.8, dated Jul. 2, 2021.
Casella et al., "An electrochemical and XPS study of the electrodeposited binary Pd-Sn catalyst: The electroreduction of nitrate ions in acid medium", *Journal of Electroanalytical Chemistry* 588 (2006) 147-154.
Papaderakis et al., "Electrocatalysts Prepared by Galvanic Replacement", *Catalysts* 7, 80 (2017) 1-34.
Examination Report issued in Corresponding GC Application No. 2018-35911, dated Feb. 20, 2020.
Extended European Search Report issued in Corresponding European Application No. 18848444.8, dated Oct. 5, 2021.
Office Action issued in Corresponding Taiwanese Application No. 107129694, dated Aug. 10, 2021 (English Translation provided).
Partial Supplementary Search Report issued in Corresponding European Application No. 18848444.8, dated Jul. 2, 2021.
Search Report issued in Corresponding Taiwanese Application No. 107129694, dated Aug. 10, 2021 (English Translation provided).
Office Communication issued in corresponding Chinese Patent Application No. 201880054684X, dated Aug. 1, 2022.

\* cited by examiner

COMPOSITIONS, METHODS, AND APPARATUSES FOR CATALYTIC COMBUSTION

CROSS-REFERENCE TO RELATED APPLICATIONS

This application is a national phase application under 35 U.S.C. § 371 of International Application No. PCT/AU2018/050895 filed 22 Aug. 2018, which claims priority to U.S. Provisional Application No. 62/549,816, filed 24 Aug. 2017. The entire contents of each of the above-referenced disclosures is specifically incorporated by reference herein without disclaimer.

FIELD

The invention relates to the catalytic combustion of fuel mixtures. In particular, the invention relates to the catalytic combustion of clean fuel mixtures.

BACKGROUND

Various fuels have been used to harness energy. Traditionally, the majority of fuels are derived from fossil fuels. However, the use of fossil fuels may result in the generation of emissions of carbon dioxide and other greenhouse gases. There is growing evidence that these emissions may contribute to anthropogenic climate change, and to a decrease in overall air quality.

In response to these findings, efforts have been made to shift sources of energy from fossil fuels to fuels derived from cleaner sources. For example, coal fired equipment has been shut down in many nations in order to reduce emissions to improve air quality. This equipment may be found, for example, in power plants or district heating plants. These plants may contain other equipment, such as steam equipment and/or turbines, which may be converted for use with other fuels to generate electricity or heating.

One potential source of clean energy is hydrogen. Hydrogen may be produced in a number of ways, including steam reformation or electrolysis. When the electricity for electrolysis is derived from clean sources, such as nuclear, wind, tidal, or solar, the hydrogen produced does not result in the generation of carbon emissions. Hydrogen reacts with oxygen to form water and releases energy.

This reaction has been used by fuel cells to directly generate electricity. However, factors such as the degradation of membranes and complicated manufacturing processes for fuel cells have held back the adoption of hydrogen as a fuel. Hydrogen has also been used as a fuel in internal combustion engines. However, these systems may be complex and there are challenges with the safe handling of such systems.

Catalytic combustion systems have been used, but such systems often require complex or costly systems to initiate a self-sustaining reaction, such as preheating systems. Even when self-sustaining reactions are started, these systems are often limited by temperatures that can be used due to ablation of catalytic material and concerns regarding the ignition of bulk fuel.

There is a need for improved systems and methods for utilizing clean sources of energy.

SUMMARY

In an aspect, there is provided a catalyst composition including a hydrogen oxidation catalyst (HOC); and an oxygen reduction catalyst (ORC). The catalyst is adapted for low temperature activation of a hydrogen combustion reaction.

In some embodiments the ratio of the surface area of the HOC to surface area of the ORC is between about 9:1 and about 4:1. In some embodiments the ratio of the surface area of the HOC to the surface area of the ORC is about 20:3. In some embodiments the HOC and the ORC are formed by electrodeposition. In some embodiments the catalyst is adapted to activate hydrogen combustion at a temperature of below about 140° C. In some embodiments wherein the catalyst is adapted to activate hydrogen combustion at a temperature of below 20° C. In some embodiments the HOC is a noble metal. In some embodiments the HOC is platinum or palladium. In some embodiments the HOC is palladium. In some embodiments the ORC is stannous oxide.

In an aspect, there is provided a process for applying a catalyst composition including providing a substrate; applying a catalyst composition to the substrate to form a catalytic surface. The catalyst composition applied includes a hydrogen oxidation catalyst (HOC) and an oxygen reduction catalyst (ORC). The catalytic surface is adapted for low temperature activation of a hydrogen combustion reaction.

In some embodiments the catalytic surface includes an HOC area and an ORC area having a ratio of between about 9:1 and about 4:1. In some embodiments the ratio of the HOC area to the ORC area is about 20:3. In some embodiments the applying of the catalyst composition comprises applying of the HOC and applying of the ORC. In some embodiments ORC is applied after applying of the HOC. In some embodiments the applying of the catalyst composition includes electroplating the HOC, the ORC, or both to the substrate. In some embodiments applying of the catalyst composition includes electroplating the HOC to the substrate. In some embodiments applying of the catalyst composition includes electroplating the ORC to the HOC-applied substrate. In some embodiments applying a precursor to the substrate prior to applying the catalyst composition, wherein the precursor enhances adhesion of the catalyst composition to the substrate. In some embodiments the precursor is nickel or copper. In some embodiments applying the precursor includes electroplating the precursor to the substrate. In some embodiments there is provided a process of heating treatment of the catalyst-applied substrate.

In an aspect, there is provided a reactor apparatus. The apparatus includes a conduit having an inlet for receiving a first fluid material and an outlet; a heating element bonded to the conduit comprising a catalytic surface having a catalyst composition applied thereon for catalytically combusting a fuel mixture, the catalyst composition including a hydrogen oxidation catalyst (HOC) and an oxygen reduction catalyst (ORC); and a shell surrounding the conduit, the shell having an inlet for receiving a second fluid material and an outlet. One of the first fluid material and the second fluid material includes the fuel mixture and the other of the first fluid material and the second fluid material includes a heat exchange medium. Energy released by the catalytic combustion of the fuel mixture is transferred to the heat exchange medium. The catalyst composition is adapted to lower the activation energy of the combustion of the fuel mixture such that the reaction occurs under low temperatures.

In some embodiments the fuel mixture comprises hydrogen and oxygen. In some embodiments the fuel mixture consists of hydrogen and oxygen. In some embodiments, there is provided a distributor for distributing the fuel mixture proximate to the heating element. In some embodiments the heating element further comprises at least one fin, and at least a portion of the catalyst surface is on the at least one fin.

In an aspect, there is provided a method for heating a heat exchange medium. A fuel mixture comprising a fuel and an oxidizer is supplied to a catalytic reactor having a catalytic heating element. The catalytic heating element includes a catalytic surface having a hydrogen oxidation catalyst (HOC), and an oxygen reduction catalyst (ORC), and is adapted to lower the activation energy of a combustion of the fuel mixture such that the combustion occurs at low temperatures. The fuel mixture is catalytically combusted on the catalytic surface. The heat generated by the catalytic combustion is transferred to a heat exchange medium.

In an aspect, there is provided a catalytic combustor. The combustor includes a catalytic surface having a catalytic composition as described herein, or prepared by a process as described herein.

In an aspect, there is provided a method for catalytically combusting a fuel mixture. A fuel mixture comprising a fuel and an oxidizer to a catalytic combustor or reactor as described herein and is catalytically combusted on a catalytic surface of the catalytic combustor or reactor.

In some embodiments the HOC and the ORC are present on the catalytic surface in a ratio of between about 9:1 and about 4:1 by surface area. In some embodiments the HOC and the ORC are present on the catalytic surface in a ratio of about 20:3 by surface area. In some embodiments the fuel is hydrogen and the oxidizer is oxygen. In some embodiments the catalytic combustion occurs at a pressure below atmospheric pressure.

In an aspect, there is provided a reactor apparatus comprising: a heating element comprising a plurality of plates, each plate comprising a catalytic surface having a catalyst composition applied thereon, the catalyst composition for catalytically combusting a fuel, the catalyst composition including a hydrogen oxidation catalyst (HOC) and an oxygen reduction catalyst (ORC); and a conduit in contact with the plurality of plates, the conduit including: an inlet for receiving a heat exchange medium, and an outlet; and a shell surrounding the conduit and the heating element, the shell having one or more inlets for receiving the fuel and an oxidizer; wherein energy released by the catalytic combustion of the fuel is transferred to the heat exchange medium; and wherein the catalyst composition is adapted to lower the activation energy of the combustion of the fuel such that the reaction occurs under low temperatures.

In some embodiments the plurality of plates are stacked. In some embodiments the plurality of plates is corrugated. In some embodiments the conduit is positioned between two adjacent plates. In some embodiments the conduit weaves between two adjacent plates. In some embodiments there is provided a lumen or groove at a contact point between two adjacent plates, the lumen or groove for receiving the conduit. In some embodiments adjacent plates are spaced apart by a joint member. In some embodiments the joint member has a lumen or groove for receiving the conduit. In some embodiments there is provided a combustion cavity between two adjacent plates. In some embodiments there is provided one or more distributor for distributing the fuel and the oxidizer to the combustion cavity proximate to the plurality of plates. In some embodiments the one or more distributor comprises a first distributor for distributing the fuel and a second distributor for distributing the oxidizer. In some embodiments mixing of the fuel and the oxidizer occurs in the combustion cavity. The reactor of any one of claims 23-39, wherein the catalytic surface includes an HOC area and an ORC area having a ratio of between about 9:1 and about 4:1. In some embodiments the ratio of the HOC area to the ORC area is about 20:3. In some embodiments there is provided a preheater upstream of and in thermal contact with the reactor, for preheating the heat exchange medium or the fuel mixture. In some embodiments the heat exchange medium comprises water. In some embodiments the transfer of the energy to the water effects vaporization to produce steam. In some embodiments the heating element is modular.

In an aspect, there is provided a catalytic combustion system comprising one or more of the reactor or catalytic combustor as described herein.

BRIEF DESCRIPTION OF DRAWINGS

Aspects of the invention will now be described with the following accompanying drawings.

DETAILED DESCRIPTION

Figure 1A:
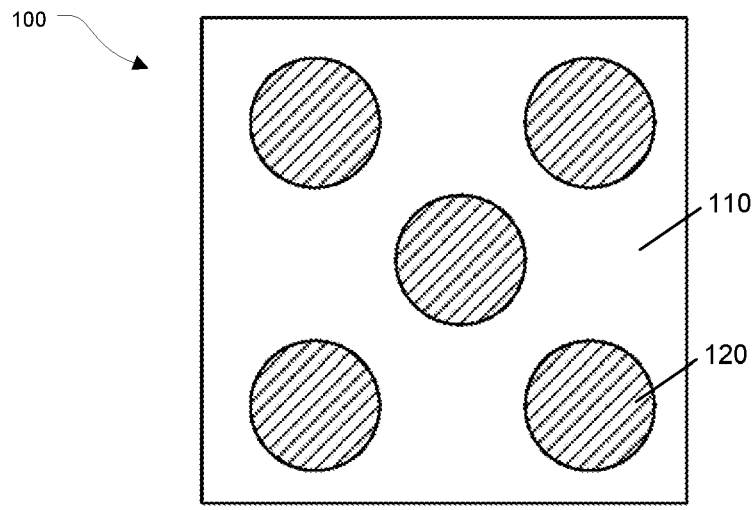
FIG. 1A is a schematic diagram illustrating a catalyst surface showing a continuous phase including a hydrogen oxidation catalyst and a discontinuous phase including an oxygen reduction catalyst.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative sense, rather than a restrictive sense.

Catalyst Composition

In an aspect, there is provided a catalyst composition comprising a hydrogen oxidation catalyst (HOC) and an oxygen reduction catalyst (ORC). The catalyst composition adapted for low temperature activation of a hydrogen combustion reaction.

In some embodiments, the HOC is a material on whose surface molecular hydrogen dissociates into hydrogen radicals. In some embodiments, the HOC is a noble metal. In some embodiments, the noble metal is palladium or platinum. In some embodiments, the noble metal is palladium.

In some embodiments, the ORC is a material on whose surface molecular oxygen dissociates into oxygen radicals. In some embodiments, the ORC is iron, zinc, silver, copper, tin, their oxides, or any combination thereof. In some embodiments, the ORC is $SnO_2$.

In some embodiments, upon the introduction of molecular hydrogen and molecular oxygen to the catalyst composition, the HOC effects the dissociation of the molecular hydrogen into hydrogen radicals and the ORC effects the dissociation of molecular oxygen into oxygen radicals. The transport of two of the hydrogen radicals to one of the oxygen radicals at the catalyst surface effects the formation of water. The overall reaction is exothermic and may be considered a catalytic combustion of hydrogen. Energy released by the catalytic hydrogen combustion may be harnessed for other purposes. In some embodiments, the energy released by the reaction is used to heat a heat exchange medium. In other embodiments, the energy released by the reaction is converted into work.

In some embodiments, the catalyst composition lowers activation energy of the hydrogen combustion reaction such that the reaction occurs at low temperatures. For example, the activation energy of the reaction may be lowered such that the reaction occurs at a temperature below 140° C., 100° C., 50° C., 30° C., 20° C., 15° C., or even below 10° C. In some embodiments, the hydrogen combustion reaction occurring on the catalyst surface does not ignite bulk molecular hydrogen. In such embodiments, the catalytic combustion is a flameless catalytic combustion.

In some embodiments, the HOC and the ORC are configured to have high interfacial perimeter. In some embodiments, the ratio of the surface area of the HOC to surface area of the ORC is between 9:1 and 4:1. In some embodiments, the ratio of the surface area of the HOC to the surface area of the ORC is about 20:3. In some embodiments, these surface area ratios of HOC and ORC provide sufficient interfacial perimeter and amounts of the catalytic material to lower the activation reaction such that the hydrogen combustion reaction may proceed at lower temperatures.

Figure 1B:
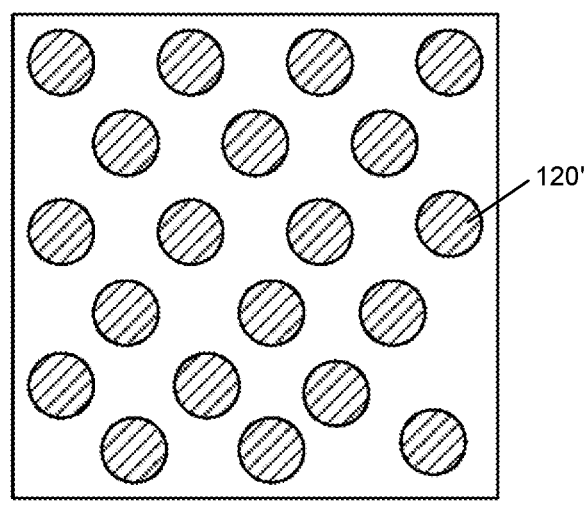
FIG. 1B is a schematic diagram illustrating a catalyst surface showing a continuous phase including a hydrogen oxidation catalyst and a discontinuous phase including an oxygen reduction catalyst where the total area of the discontinuous phase is the same as that shown in FIG. 1A but having a greater interfacial perimeter.

In some embodiments, with reference to FIGS. 1A and 1B, on a surface of the catalyst 100, the HOC forms a continuous surface area 110 and the ORC forms discontinuous surface areas 120. In some embodiments, HOC and the ORC are configured to increase the total interfacial perimeter between the continuous surface area and the discontinuous surface areas. For example, reducing the size of each discontinuous surface area 120' while increasing the number of discontinuous surface areas results in increased the total interfacial perimeter for the same total discontinuous surface area.

When the activation energy for the catalytic hydrogen combustion reaction is lowered such that the reaction occurs at low temperatures, for example, at room temperature, the reaction may be initiated by merely introducing hydrogen and oxygen to the catalyst composition without requiring a preheating or other initiation step. By removing preheating, the complexity and cost of a catalyst hydrogen combustion system may be reduced. Further, preheating introduces a potential risk of unintended premature hydrogen combustion, which may result in loss of efficiency or safety concerns.

Catalyst Preparation

In some embodiments, the catalyst composition is prepared according to a method as described below. In some embodiments, the catalyst composition is formed by electroplating.

Figure 2:
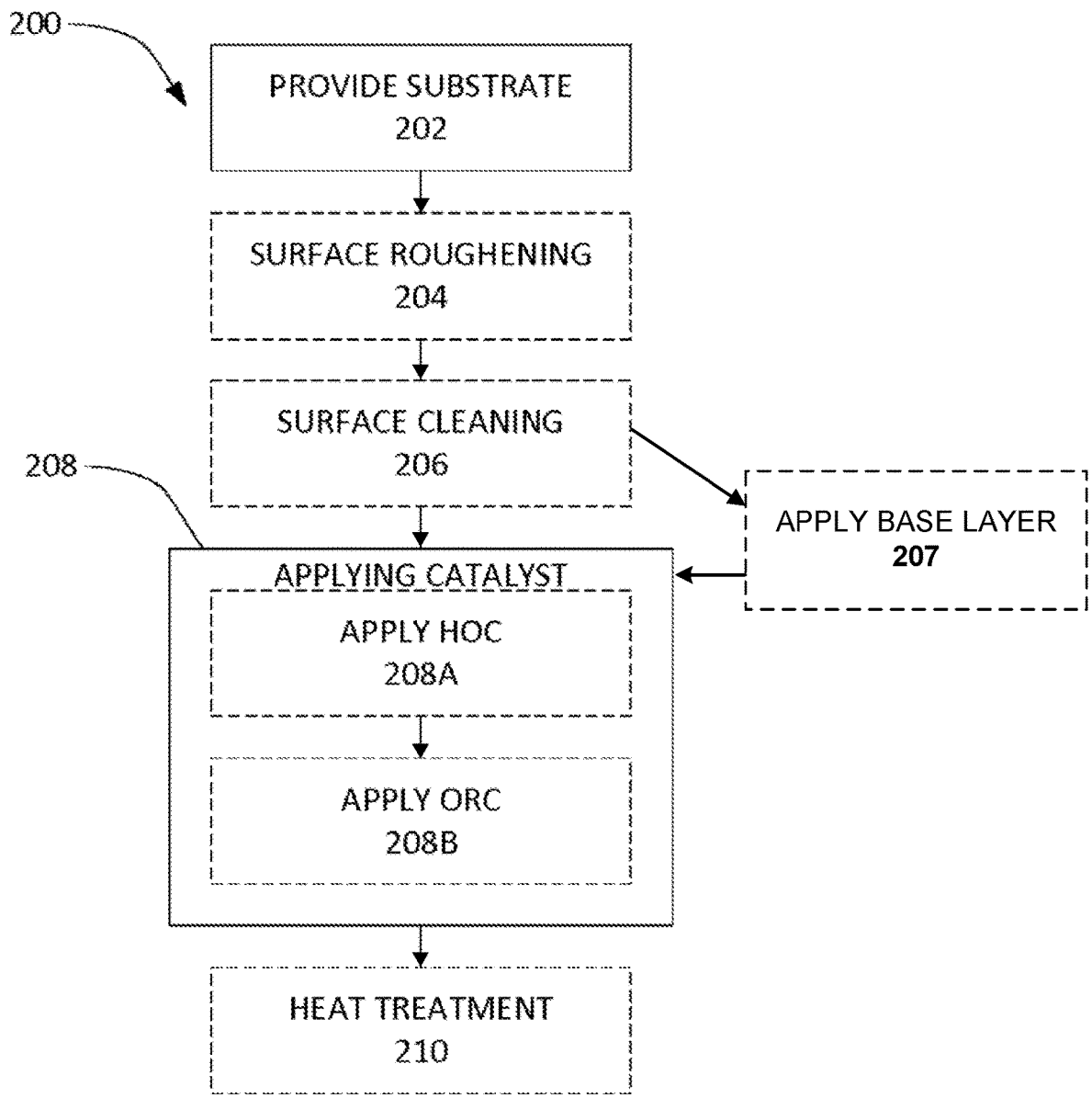
FIG. 2 is a block diagram illustrating a process for applying a catalyst composition according to an embodiment of the invention.

In an aspect, there is provided a method 200 for preparing a catalyst composition. Referring to FIG. 2, the process includes providing a substrate at 202. At 208, a catalyst composition is applied to the substrate to form a catalytic surface. The catalyst composition includes a hydrogen oxidation catalyst (HOC) and an oxygen reduction catalyst (ORC). The catalytic surface is adapted for low temperature activation of a hydrogen combustion reaction.

In some embodiments, catalyst composition includes an HOC area and an ORC area. In some embodiments, the catalytic surface includes an HOC area and an ORC area present in a ratio of between about 9:1 and about 4:1. In some embodiments, the ratio of the HOC area and the ORC area is about 20:3.

In some embodiments, the substrate is resistant to hydrogen embrittlement. In some embodiments, the substrate is a graphite, ceramic, austenitic stainless steel, aluminum, aluminum alloy, or copper alloy. In some embodiments, the substrate is graphite, ceramic, austenitic stainless steel, or copper alloy. In some embodiments, the substrate is graphite or austenitic stainless steel. In some embodiments, the substrate is graphite. In some embodiments, the substrate is 316 stainless steel. In some embodiments, the substrate is a heat conductor. The conduction of heat across the substrate may reduce accumulation of heat at a reaction site, thereby decreasing the formation of hot spots.

In some embodiments, the applying of the catalyst composition includes applying the HOC at 208A, and applying the ORC at 208B. In some embodiments, the HOC is applied prior to the application of the ORC. In some embodiments, the ORC is applied prior to the application of the HOC. In some embodiments, the HOC and the ORC are applied in a single step. In some embodiments, the applying of the catalyst composition includes coating the substrate with the HOC, the ORC, or both. In some embodiments, the coating includes electroplating or applying a molten catalyst material to the substrate. In some embodiments, the coating includes electroplating.

In some embodiments, the applying of the catalyst composition results in the formation of a protective surface. For example, in some of embodiments the catalyst composition inhibits the oxidation of the substrate. As such, in some the applying of the catalyst may allow for the usage of a larger variety of substrate materials.

In some embodiments, the applying of the catalyst composition includes applying precursors or strike. In one embodiment, applying a precursor includes applying a base layer prior to applying the catalyst composition. In some embodiments, the base layer is a strike. As used herein, the term "strike" refers to a layer applied between the substrate and the catalyst for facilitating bonding or adhesion of the catalyst to the substrate. In one embodiment, the strike is nickel. In other embodiments, the strike is copper, zinc, or copper. In such embodiments where a strike is applied, the process includes one or more finishing steps including heat treatments.

In some embodiments, the substrate has a textured surface. A textured surface may provide improved adhesion of the catalyst material onto the substrate. The surface texture balances the adhesion of the catalyst material to the substrate with thermal conduction and construction requirements. In some embodiments, the substrate surface has a roughness value $R_a$ of approximately 12.5 μm or a ISO Roughness Grade of N10.

In some embodiments, the substrate is roughened at 204 prior to the applying of any catalyst material to provide a desired texturing. In some embodiments, the substrate is roughened using a mechanical process, such as sanding, sand blasting, filing, scribing scratches, and knurling.

In some embodiments, the substrate is cleaned at 206 prior to or during the applying any catalyst material. The cleaning removes surface impurities from the substrate to improve adhesion of catalyst material. In some embodiments, the surface impurities include grease, residue from the mechanical roughening treatment, or both. In some embodiments, the cleaning includes electrolytic cleaning, washing with a solvent, or both. In some embodiments, the cleaning includes chemical cleaning, ultrasonic cleaning, or both.

In one preferred embodiment, a base layer is applied 207 to the substrate prior to applying the catalyst composition 208. In some embodiments, the base layer is a nickel base coating. In one embodiment, the nickel base coating is electrolytically applied using a NiCl salt in a solvent of Boric Acid to a depth of between 100 and 500 microns, at a voltage of 3-10V and current of 2-5 A. The coverage of the substrate is inspected using Scanning Electron Microscope (SEM)/Energy Dispursive Xray (EDX). Preferably, a smooth, contiguous coating of the base layer is applied to the substrate having coverage of greater than 80% of the substrate, greater than 90% of the substrate, greater than 95% of the substrate, greater than 99% of the substrate, or 100% of the substrate. The nickel base layer facilitates bonding of the catalyst to the substrate. In one embodiment, the nickel base layer improves adhesion of HOC to a stainless steel substrate, since the nickel base layer has strong affinity or bonding to both the stainless steel substrate and the HOC. In some embodiments, nickel base layer greatly improves adhesion of the catalyst to heating element plates of a reactor and increases the longevity of the material.

In other embodiments, the applying of the HOC 208A includes coating the substrate directly with the catalyst. In some embodiments, the coating includes electroplating the substrate with the HOC. In some embodiments, the electroplating includes applying a current to a substrate immersed in a HOC electroplating solution comprising a salt of the HOC and a solvent.

In some embodiments, applying the HOC includes coating a substrate having a base layer coating. In one embodiment, the base layer is nickel. In some embodiments, the coating includes electroplating the base layer-coated substrate with the HOC. In some embodiments, the electroplating includes applying a current to a base-layer coated substrate immersed in a HOC electroplating solution comprising a salt of the HOC and a solvent.

In some embodiments, the salt of the HOC is an ammonium or chloride salt. In some embodiments, the salt of the HOC is ammonium palladium chloride or palladium chloride. In some embodiments, the salt is palladium chloride. In some embodiments, the salt of the HOC is present at a concentration of between about 5 mM and about 15 mM. In some embodiments, the salt of the HOC is present at a concentration of between about 7 mM and about 10 mM. In some embodiments, the salt of the HOC is present at a concentration of about 8.8 mM.

In some embodiments, the solvent includes aqueous ammonia.

In some embodiments, the HOC electroplating solution includes a conductivity agent. In some embodiments, the conductivity agent includes NaCl.

In some embodiments, the electroplating includes applying a voltage of between about 5V and about 32V. In some embodiments, the electroplating includes applying a current of between about 0.3 A and about 3 A. In some embodiments, the electroplating is effected for about 15 minutes.

In some embodiments, the thickness of the HOC applied to the substrate is between about 100 μm and about 1000 μm. In some embodiments, the thickness of the HOC applied to the substrate is about 250 μm.

In some embodiments, after the electroplating the HOC, the substrate is treated to stabilize the HOC. In some embodiments, the stability treatment includes heating the substrate with the HOC electrodeposited thereon. In some embodiments, the heating is effected at a temperature of about 100° C.

In some embodiments, the applying of the ORC 208B includes coating the substrate. In some embodiments, the applying of the ORC includes directly applying the ORC to the substrate. In other embodiments, the applying of the ORC includes applying the ORC to the HOC-coated substrate. In some embodiments, the coating includes electroplating the substrate with the ORC. In some embodiments, the electroplating includes applying a current to a substrate immersed in an ORC electroplating solution comprising a salt of the ORC and a solvent.

In some embodiments, the salt of the ORC is a chloride salt. In some embodiments, the salt of the ORC is stannous chloride. In some embodiments, the salt of the ORC is present at a concentration of between about 5 mM and about 10 mM. In some embodiments, the salt of the ORC is present at a concentration of about 6.6 mM.

In some embodiments, the salt is produced by dissolving an ORC salt precursor in the solvent. In some embodiments, the ORC salt precursor is an oxide. In some embodiments, the oxide is $SnO_2$.

In some embodiments, the solvent includes hydrochloric acid. In some embodiments, the ORC electroplating solution is prepared by dissolving $SnO_2$ in HCl. In some embodiments, the ORC electroplating solution is prepared by dissolving 1 g of $SnO_2$ in 800 mL of 32% HCl.

In some embodiments, the electroplating includes applying a voltage of between about 5V and about 32V. In some embodiments, the electroplating includes applying a current of between about 0.3 A and about 3 A. In some embodiments, the electroplating is effected for about 7 minutes.

In some embodiments, the thickness of the ORC applied to the substrate is between about 100 μm and about 1000 μm. In some embodiments, the thickness of the ORC applied to the substrate is about 250 μm.

In some embodiments, the substrate is inspected after the applying of the HOC or the ORC to confirm the coverage of the HOC or the ORC. In some embodiments, the substrate is inspected using SEM/EDX. In some embodiments, if insufficient coverage is obtained, a secondary application of the HOC or the ORC is effected. In some embodiments, the heat treatment (described below) results in a reduction of coverage of the ORC relative to the HOC. For example, whereas up to 40% of surface of the substrate may be covered by the ORC after its application (i.e. a 6:4 ratio of HOC area to ORC area), only 30% of the surface may be covered by the ORC after heat treatment. Inspection prior to heat treatment may be used to determine whether the pre-heat treatment coverage of the ORC is sufficient to obtain a desired post-heat treatment coverage of the ORC. As such, in some embodiments, a target coverage ratio between the ORC and the HOC is higher after application of the catalyst material than after heat treatment.

Figure 5A:
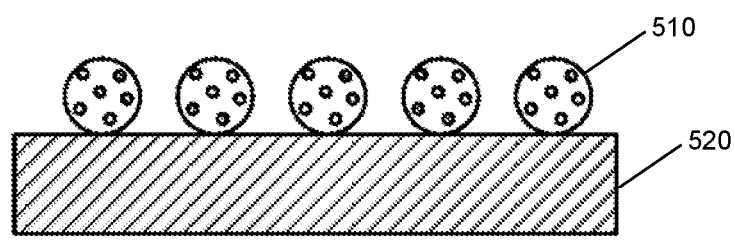
FIG. 5A is a schematic diagram illustrating catalyst particles sprayed onto a substrate.
Figure 5B:
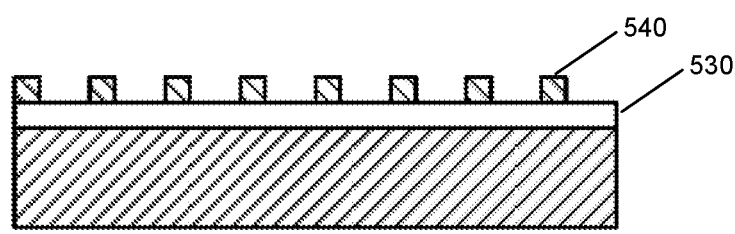
FIG. 5B is a schematic diagram illustrating catalyst that is electroplated onto a substrate according to an embodiment of the invention.

A surface coated or electroplated with HOC, ORC, or combination thereof, may exhibit less hot spot formation when undergoing catalytic combustion as compared a surface having granules or particles of catalyst thereof applied thereon. Without wishing to be bound by theory, and with reference to FIG. 5A and FIG. 5B, it is believed that the applying of granular or particulate catalyst 510 thereof results in relatively small contact areas with the underlying substrate 520. In contrast, the electroplating of the catalyst material results in the formation of thin HOC layer 530 and ORC 540 applied on the HOC layer, where heat is easily transferred to the substrate. When a fuel mixture including a fuel and an oxidizer is introduced to the catalyst surface, the fuel undergoes a combustion process whereby heat is released. If the heat is not transferred away from the catalyst, localized "hot spots" may be created, and may result in the ablation of catalyst from the surface, or in the ignition of the fuel mixture that can cause a flame or explosion. By increasing the contact area between the catalyst and the underlying substrate, heat may be more efficiently transferred away from the catalyst, reducing the formation of hot spots. The more even distribution of heat may allow the use of higher operating temperatures.

In some embodiments, the substrate having HOC and ORC applied thereon is subjected to one or more finishing steps at 210. In some embodiments, the one or more finishing steps include heat treatment. In some embodiments, the heat treatment occurs under air or $N_2$. In some embodiments, the heat treatment occurs under air. In some embodiments, the heat treatment is effected after the application of the HOC to the substrate, the application of the ORC to the substrate, or both. In some embodiments, the heat treatment includes a HOC heat treatment and an ORC heat treatment.

In some embodiments, heat treatment of the HOC is effected after the stability treatment. In some embodiments, heat treatment of the HOC is effected at a temperature of between about 800° C. and about 1200° C. In some embodiments, the heat treatment of the HOC is effected at a temperature of about 900° C. In some embodiments, the heat treatment is effected for between about 30 minutes and about 4 hours. In some embodiments, the heat treatment is effected for about one hour. In some embodiments, the heat treatment causes annealing of the HOC applied to the substrate. In some embodiments, the heat treatment causes annealing of the HOC to the base layer.

In some embodiments, heat treatment of the ORC is effected after a stability treatment. In some embodiments, heat treatment of the ORC is effected at a temperature of between about 200° C. and about 600° C. In some embodiments, the heat treatment of the ORC is effected at a temperature of about 400° C. In some embodiments, the heat treatment is effected for between about 30 minutes and about 4 hours. In some embodiments, the heat treatment is effected for about one hour.

In some embodiments, the heat treatment activates or increases the catalytic activity of the HOC, the ORC, or both. In some embodiments, the heat treatment activates or increases the activity of the ORC. In some embodiments, the heat treatment effects calcination of the HOC, the ORC, or both. In some embodiments, an ORC precursor is applied and the heat treatment effects formation of the ORC, such as by converting the ORC precursor into the ORC.

In some embodiments, tin is applied to the substrate, and the heat treatment effects the formation of stannous oxide.

Reactors

Figure 3:
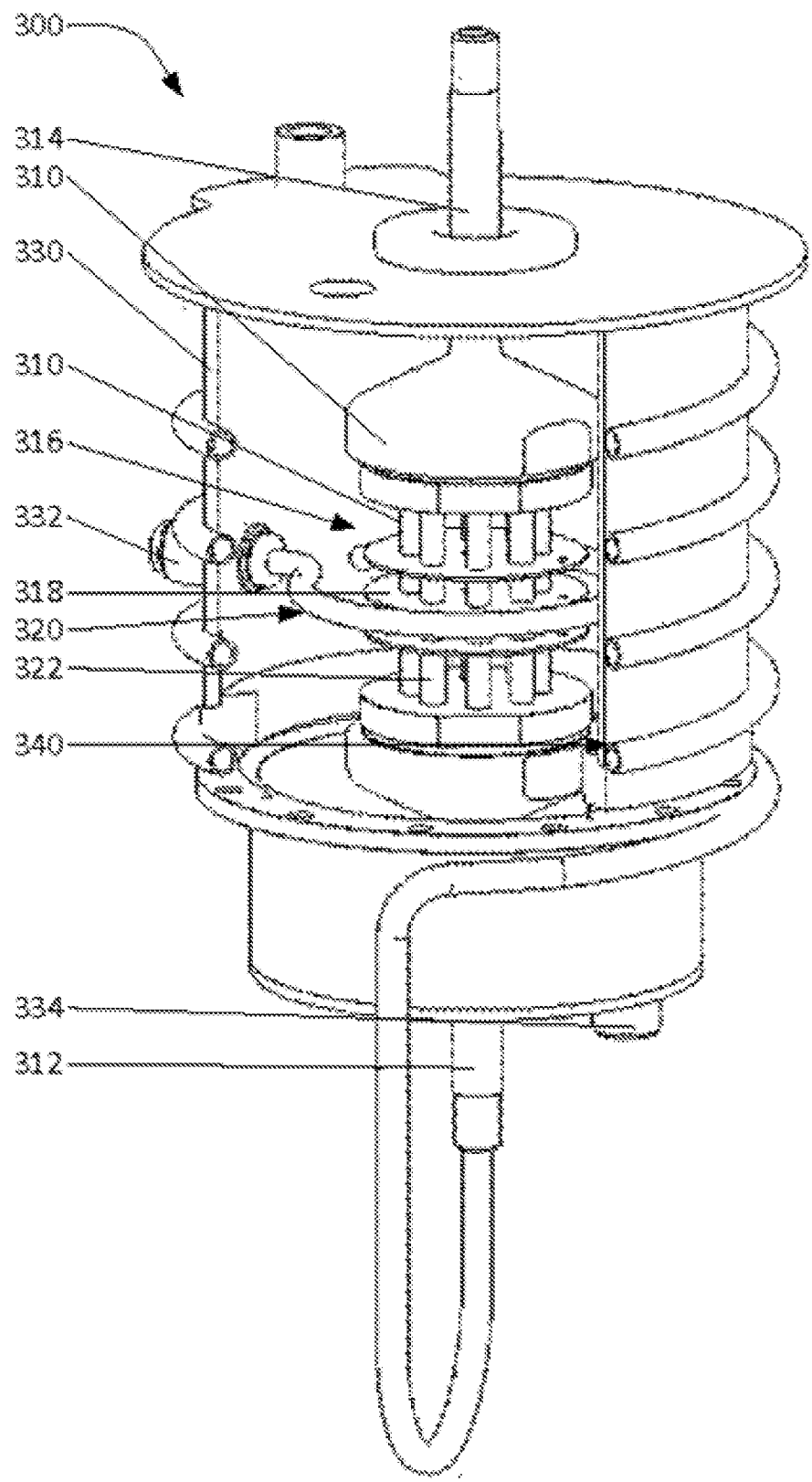
FIG. 3 is an perspective view of a heat exchanger cross section according to an embodiment of the invention.

Having reference to FIG. 3, in an aspect, there is provided a reactor 300. In one embodiment, the reactor is a heat exchanger. The reactor 300 includes a conduit 310 having an inlet 312 for receiving a first fluid material and an outlet 314; and a shell 330 surrounding the conduit 310 having an inlet 332 for receiving a second fluid material and an outlet 334. One of the first fluid material and the second fluid material is a fuel mixture. The other of the first fluid material and the second fluid material is a heat exchange medium. The conduit 310 includes heating element 316 having disposed thereon a catalyst composition including a hydrogen oxidation catalyst (HOC) and an oxygen reduction catalyst (ORC). The heating element 316 is configured to effect the catalytic combustion of the fuel mixture and transfer the energy released by the catalytic combustion to the heat exchange medium. In some embodiments, the catalyst composition lowers the activation energy of the catalytic combustion such that it occurs at low temperatures.

In some embodiments, the catalyst composition is a catalyst composition as described above. In some embodiments, the heating element 316 includes a substrate having the HOC and the ORC applied thereon. In some embodiments, the HOC and the ORC are applied to the substrate using the method as described above. In some embodiments, the ratio of the HOC to the ORC is between about 9:1 and about 4:1 by surface area. In some embodiments, the ratio of the HOC to the ORC is about 20:3 by surface area.

In some embodiments, the fuel mixture includes a fuel and an oxidizer. In some embodiments, the fuel includes hydrogen, a hydrocarbon material, or a mixture thereof. In some embodiments, the hydrocarbon material is a renewable hydrocarbon material, such as biodiesel, biogas, or algae fuel. In some embodiments, the fuel is hydrogen. In some embodiments, the oxidizer includes oxygen, oxygen-enriched air or air. In some embodiments, the oxidizer is oxygen.

In some embodiments, the inlet receiving the fuel mixture comprises fuel inlet and an oxidizer inlet. In this manner, the fuel mixture does not need to be premixed. By introducing the components of the fuel mixture at the reactor, the composition of the fuel mixture may be better controlled. Any changes to the composition of the fuel mixture introduced to the reactor are effected more rapidly since transport delays may be minimized. Further, without an oxidizer present with the fuel, the transport of the fuel and oxidizer separately may be relatively safer than transporting the fuel mixture.

In some embodiments, the heat exchange medium includes water or helium. In some embodiments, the heat exchange medium includes or is water. In such embodiments, catalytic combustion of the fuel mixture heats the water. In some embodiments, the water is heated to generate steam. Steam generated by the heat exchanger 300 may be used for various purposes. For example, the steam may be used to drive turbines to generate electricity, to provide energy in district heating applications, or in other applications requiring steam.

In some embodiments, at least a portion of the heating element 316 is integral to a surface of the conduit 310. In some embodiments, at least a portion of the heating element 316 is bonded to a surface of the conduit 310.

In some embodiments, the heating element 316 includes a plurality of fins 318. The addition of fins may increase the surface area on which the catalytic hydrogen combustion can take place. In some embodiments, one or more of the fins are rippled or have a concertina shape to further increase the surface area. In some embodiments, the plurality of fins 318 is bonded to conduit 310. The bonding of the fins facilitates the transfer of heat, for example via conduction, from the fins 318 to the conduit 310 and any material in contact therewith. For example, where catalytic combustion of the fuel mixture occurs on the surface of the fins 318, the heat released by the reaction may be transferred to the heat exchange medium via the conduit 310.

In some embodiments, the reactor 300 includes a distributor 320 for distributing the fuel mixture proximate to the heating element 316. The distribution of the fuel mixture to the heating element 316 may better introduce uncombusted hydrogen to the surface of the heating element 316. In some embodiments, the distributor 320 is fluidically coupled to the inlet (312 or 332) that receives the fuel mixture. In some embodiments, the distributor 320 includes a plurality of hooked pipes, each defining orifices for delivering the fuel mixture to the heating element 316. In some embodiments, the distributor 320 varies the composition of the fuel mixture delivered to different zones of the heating element 316 such that each zone is provided with an individualized fuel mixture. For example, each of the plurality of pipes may deliver an independent fuel mixture.

In some embodiments, the conduit 310 includes a plurality of tubes 322. In this manner, the rate of heat transfer to the heat exchange medium is increased by maximizing the ratio of the surface area to the volume. In some embodiments, the tubes 322 are arranged in a single pass arrangement whereby fluid received at one end of the conduit 310 is conducted to another end. In some embodiments, the tubes are arranged in a multi-pass arrangement whereby fluid received at one end of the conduit is conducted to the other end and back to the first end, and optionally for more passes.

In some embodiments, the conduit 310 receives the heat exchange medium and the shell 330 receives the fuel mixture. In such embodiments, the heating element 316 is disposed on the outside of the conduit 310 and exposed to the interior volume of the shell 330. Heat generated by the catalytic combustion of the fuel mixture is transferred to the heat exchange medium disposed within the conduit 310.

In some embodiments, the catalytic combustion of the fuel mixture effects heating of the shell 330. In some embodiments, a preheater 340 in contact with an exterior surface of the shell 330 transfers heat released by the catalytic combustion of the fuel mixture to the fuel mixture or the heat exchange medium prior to its introduction into the conduit 310 or the shell 330. In some embodiments, the preheater 340 is disposed upstream of the conduit 310 and preheats the heat exchange medium prior to its introduction into the upstream conduit 310. In some embodiments, the heat exchange medium is heated to a temperature of about 90° C. prior to its introduction into the inlet.

In some embodiments, unreacted fuel in the fuel mixture is recycled back into the heat exchanger. The recycling of fuel reduces the amount of uncombusted fuel that must be treated or stored. In some embodiments, a downstream condenser (not shown) removes water from the combustion products. By removing the water from the combustion products, the recycled fuel may contain less thermal diluent. Thermal diluent may cause a decrease in the operating temperature or an increase in the formation of condensation on the catalytic surface, which may reduce or inhibit combustion.

In some of those embodiments where the fuel is hydrogen, components configured for contact therewith are made from materials resistant to hydrogen embrittlement. For example, hydrogen embrittlement-resistant materials include austenitic stainless steel, copper, copper alloys, aluminum, aluminum alloys, and ceramics.

In some of those embodiments where the shell 330 receives the fuel mixture, the interior of the shell is coated with a reflective material to reduce or minimize radiative heat loss. In some embodiments, the heat exchanger includes insulation surrounding the shell. In some embodiments, the insulation is glass wool.

Figure 8:
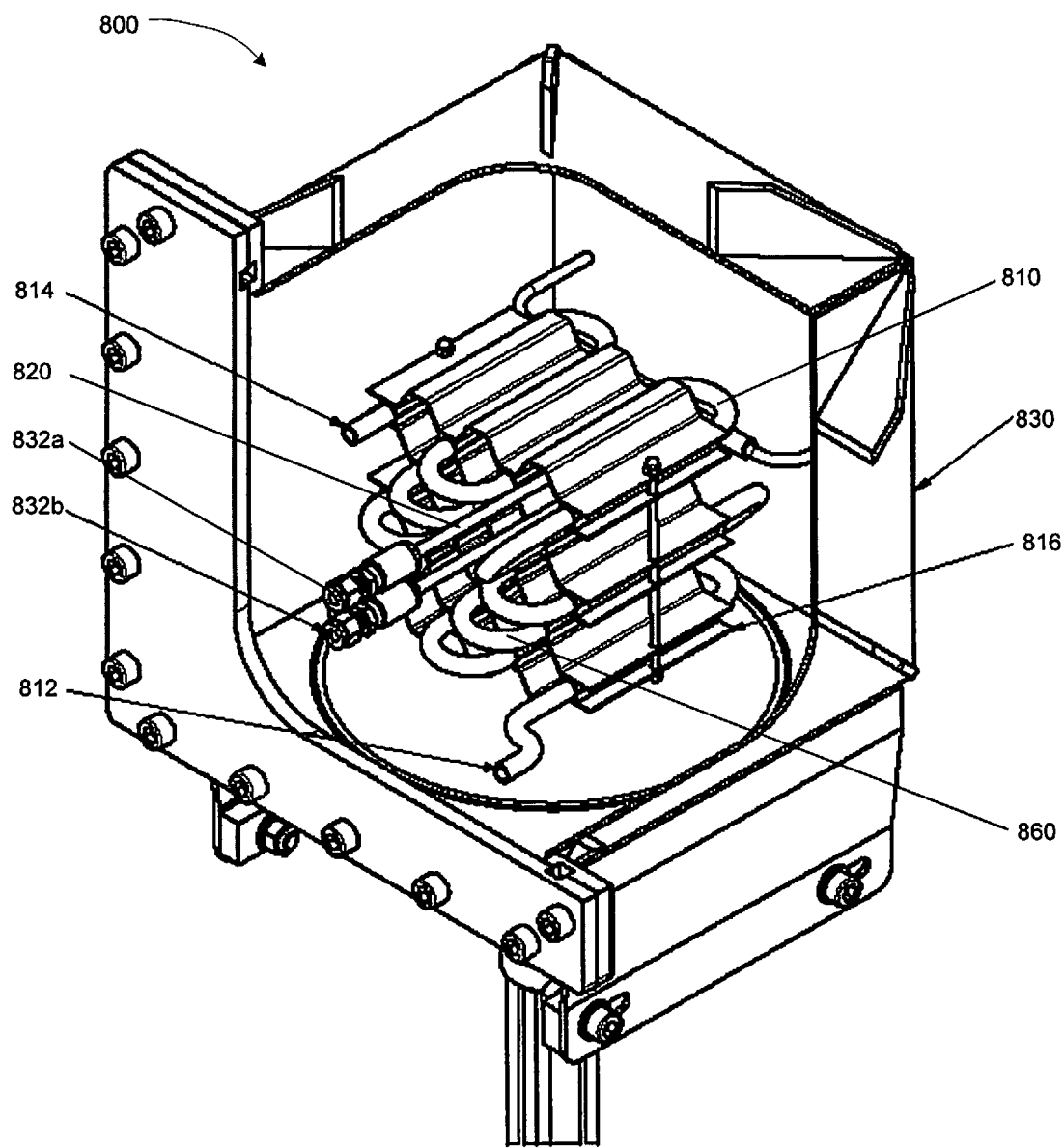
FIG. 8 is a perspective view of a heat exchanger cross section according to an embodiment of the invention. One pair of fuel and oxidizer inlets is shown.

Having reference to FIG. 8, there is provided another embodiment of a reactor 800 with improved conductive heat transfer. In some embodiments, interweaving the heating elements and the first and second fluid material conduits allows for greater transfer of heat as well as upscaling with larger volumes of fluid material and fuel.

The reactor 800 includes a conduit 810 having an inlet 812 for receiving a first fluid material and an outlet 814. The conduit 810 is connected to a heating element 816, having disposed thereon a catalyst composition including a hydrogen oxidation catalyst (HOC) and an oxygen reduction catalyst (ORC). The heating element 816 is configured to effect the catalytic combustion of the fuel mixture and transfer the energy released by the catalytic combustion to the heat exchange medium. In some embodiments, the catalyst composition lowers the activation energy of the catalytic combustion such that it occurs at low temperatures. The conduit 810 and the heating element 816 are positioned inside a reaction cavity enclosed by a shell 830. The shell 830 has one or more inlets for receiving a second fluid material. In one embodiment, the first fluid material is a heat exchange medium, and the second fluid material is a fuel and an oxidizer. In some embodiments, the second fluid material is a mixture of fuel and oxidizer. In preferred embodiments, the fuel and the oxidizer are received separately, and not pre-mixed. In some embodiments, the fuel is a mixture of one or more different types of fuels.

In one embodiment, the shell has a pair of inlets 832a, 832b for receiving a fuel mixture into the reaction cavity. In some embodiments the second fluid material includes a fuel and an oxidizer. One of the inlets 832a, 832b is for receiving the fuel, and the other is for receiving the oxidizer. In some embodiments, the fuel is a fuel as described above. In some embodiments, the heat exchange medium is a heat exchange medium as described above.

Figure 9:
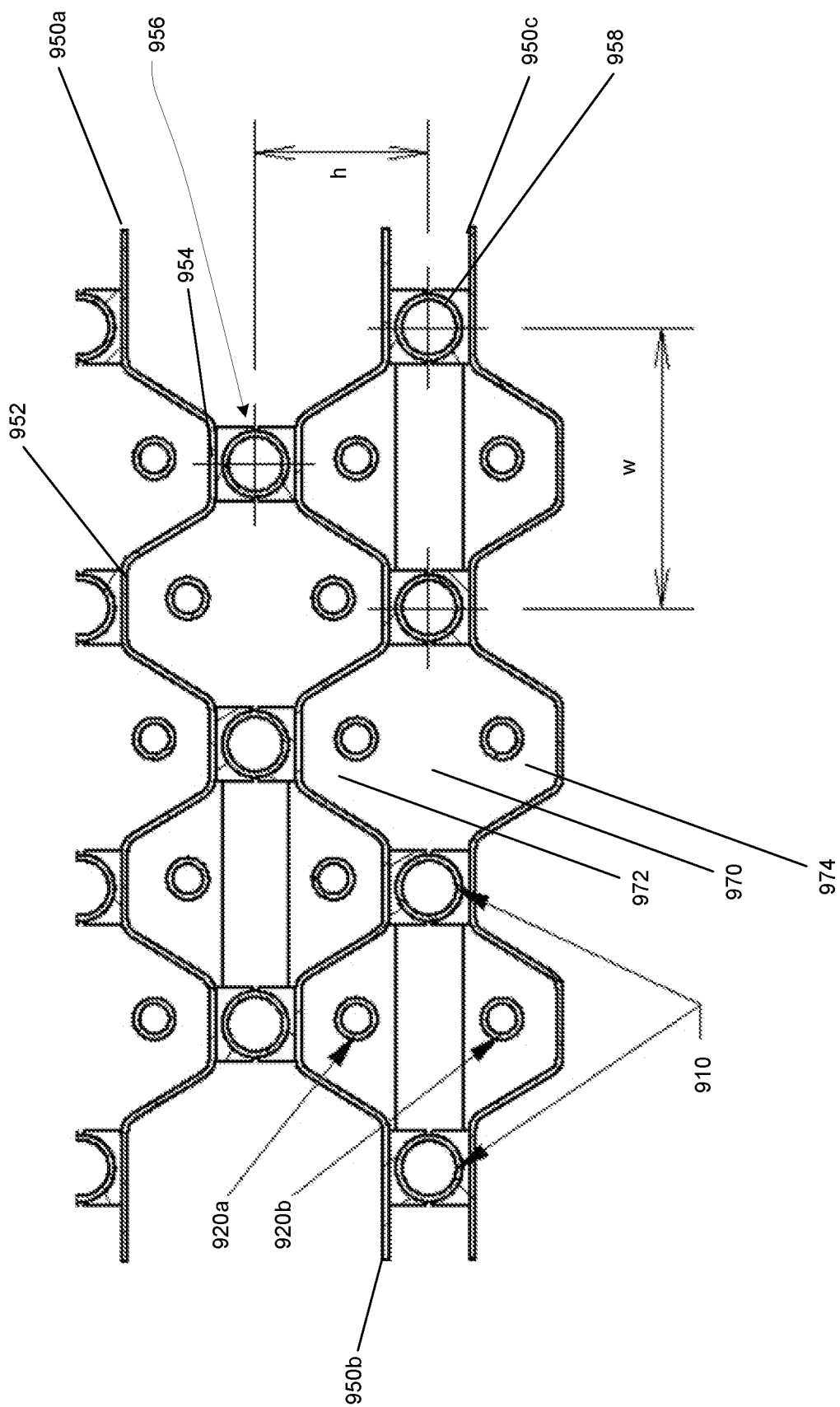
FIG. 9 is a cross sectional view of the heating element of the embodiment of heat exchanger shown in FIG. 8.

In some embodiments, the catalyst composition is a catalyst composition as described above. Having reference to FIG. 9, in some embodiments, the heating element 816 includes a plurality of horizontal plates 950a, 950b, 950c having the HOC and the ORC applied thereon. In some embodiments, the HOC and the ORC are applied to the plates using the method as described above. In some embodiments, the ratio of the HOC to the ORC is between about 9:1 and about 4:1 by surface area. In some embodiments, the ratio of the HOC to the ORC is about 20:3 by surface area.

In some embodiments, the heating element 816 includes a plurality plates including corrugated plates. In some embodiments, some of the plurality of plates are corrugated. In some embodiments, the plurality of corrugated plates are stacked. In some embodiments, the conduit 810 is positioned adjacent to where one plate contacts another.

In some embodiments, each plate has a cross-sectional shape comprising alternating ridges 952 and troughs 954. Examples of the cross-sectional shape include, but are not limited to: sinusoidal waves, zig-zags, bent, scalloped, and serrated. In preferred embodiments, each plate is attached to the adjacent plate by one or more joints 956. In some embodiments, the one or more joints keeps adjacent plates spaced apart from each other. In one embodiment, a first side of a joint is attached to a top surface of a ridge of one plate, and a second side of the joint is attached to a bottom surface of a trough of another plate. In some embodiments, each joint extends down the width of the plate and includes a lumen 958 for receiving the conduit 810. In one embodiment, a joint is formed from two joint members each having an elongated open channel where one is welded to one plate and the other is welded to an adjacent plate. When the two plates are stacked, the two elongated open channels combine to form a continuous lumen 958 for receiving the conduit 810. In other embodiments, a joint has a groove for receiving the conduit 810.

In some embodiments, the plurality of horizontal plates are stacked and held together by applying a compressive force, applied, for example, by a clamp or bolts. In some embodiments, the plurality of horizontal plate and joints are all held together by applying a compressive force, applied, for example, by a clamp or bolts. In an alternative embodiment, the plurality of horizontal plate and joints are all welded or bonded together. In yet another embodiment, the plurality of plates are directly welded or bonded together, without using a joint, and including an elongated lumen where adjacent plates contact or are bonded for receiving the conduit.

In some embodiments, the plurality of plates when stacked together have an overall cross-sectional shape that is, for example, a grid, a honeycomb, or a damask pattern.

In one embodiment, the heating element has a plurality of plates stacked together, each plate being approximate 30 mm by 400 mm. In another embodiment, the heating element has six plates stacked together, each plate being approximately 100 mm by 200 mm.

In some embodiments, the conduit 810 interweaves through the lumens of the joints, forming a loop 860 as the conduit extends out of one lumen and through the next lumen. In some embodiments, the loop 860 extends beyond the width of the plurality of plates. In some embodiments, the conduit is arranged in a single pass arrangement through the lumen whereby fluid received at one end of the lumen is conducted to another end of the lumen. In some embodiments, the conduit 810 is arranged in a multi-pass arrangement through the lumen whereby fluid received at one end of the lumen is conducted to the other end and back to the first end, and optionally for more passes.

In some embodiments, the plurality of plates are flat and each plate is bonded to the adjacent place by a plurality of elongated joints extending down the width of the plates and keeping the plates spaced apart. In this embodiment, the joints include a lumen through which the conduit 810 interweaves through.

In some embodiments, each segment 910 of the conduit that extends through a lumen is separated from the next segment by a distance "w", where w is at least 10 mm, at least 20 mm, at least 30 mm, preferably at least 40 mm. In one embodiment w is at least 42 mm. In some embodiments, each row of the conduit as it interweaves between a pair of plates is separate from the next row by a distance "h", wherein h is at least at least 10 mm, at least 15 mm, at least 20 mm, preferably at least 25 mm. In one embodiment, h is at least 26 mm.

In some embodiments, the plurality of plates are integral to a surface of the conduit 810. In some embodiments, at least a portion of the plurality of plates is bonded to a surface of the conduit 810.

In some embodiments, the reactor 800 includes a distributor 820 for distributing the fuel and oxidizer proximate to the plates. The distribution of the fuel and oxidizer to the plates may better introduce uncombusted hydrogen to the surface of the plates. In some embodiments, the distributor 820 is fluidically coupled to the one or more inlets that receive the fuel and oxidizer. The distributor extends down the width of the plates through a cavity 970 defined by a ridge of one plate and a trough of another plate. In some embodiments, the distributor 820 includes orifices for delivering the fuel mixture to the cavities 970 formed between the plates. In some embodiments, the distributor 820 has a plurality of orifices of equal or varies sizes along a length of the distributor extending down the width of the plates. In some embodiments, the size of the orifices along the length of the distributor is varied to allow for a degree of balance in the flow rate. For example, the orifices nearer the inlet end of the distributor is smaller than the orifices at the end of the distributor farthest from the inlet. Other sizes are also possible and known to a skilled person in the art.

In some embodiments, a pair of distributors 920a, 920b is fluidically coupled to respective pair of inlets 832a, 832b that respectively receives the fuel and the oxidizer. Both of the pair of distributors extends through the cavity 970 defined by a ridge of one plate and a trough of another plate, thereby delivering both the fuel and the oxidizer to the cavity 970. In some embodiments, one of the pair of distributors is positioned closer to or substantially within the portion of the cavity defined by the ridge 972, and the other of the pair of distributers is positioned closer to or substantially within the portion of the cavity defined by the trough 974. In some embodiments, the pair of distributors 920a, 920b each has a plurality of orifices of equal or varies sizes along a length of the distributor extending down the width of the plates. The orifices along one of the pairs of distributors match in longitudinal position and oppose the corresponding orifices of the other of the pair of distributors. The fuel and the oxidizer gases mix turbulently as they meet each other coming from the opposite distributor feed pipes, forming a fuel-oxidizer mixture which then makes contact with the surrounding catalytic surface of the plates. One advantage of introducing the fuel and the oxidizer separately, and mixing them as late as possible in the reactor is that this allows for a more efficient combustion, with minimal waste exhaust and maximal combustion of the fuel.

In some embodiments, the distributor has a diameter of 3-10 mm, 5-8 mm, 6-7 mm, preferably 6.35 mm. In some embodiments, the orifices have a size range of 0.1-2 mm, 0.5-1.5 mm, preferably 1 mm. Other dimensions are also possible.

In some embodiments, the reactor includes a network of distributors or a plurality of pairs of distributors to distribute the fuel and the oxidizers to the various cavities formed between the plates. In preferred embodiments, each cavity receives a pair of distributors which are fluidically coupled to its own respective pair of inlets. In such embodiments, there are a plurality of pairs on inlets and a corresponding plurality of pairs of distributors. In some embodiments, the distributor has an open end fluidically coupled to the inlet for receiving the fuel mixture; and a closed end. In this manner, fuel mixture injected through the inlets then exit through the orifices serving as outlets. In some embodiments, the pair of distributors each has an open end and closed end, and orifices through which the fuel and the oxidizer exits allowing for a high degree of mixing of the fuel and the oxidizer before they contact a surface of the plates. In alternate embodiments the distributor or the pair of distributors interweave through the various cavities formed between the plates.

In some embodiments, the reactor is a modular unit having its own shell, heating element, conduit for a heat exchange medium, and fuel inlet. In one embodiment, a catalytic combustion system includes multiple modular reactors. In one embodiment, each reactor modular unit has a heating element with 30 heating plates, 400 mm in diameter and approximately 1 mm thick. In some embodiments, a catalytic combustion system has more than 3, more than 5, more than 10, or more than 20 units of the modular reactor. In one embodiment, a catalytic combustion system has 4 to 6 reactor modular units. In one embodiment, the reactor modular units are assembled in stacks. Providing the reactors as modules has many advantages, including the ability to replace one module independently of the rest, for maintenance or repair.

In some embodiments of a catalytic combustion system, the conduit is a dedicated conduit for each reactor modular unit. In some embodiments, a catalytic combustion system has a conduit network arranged in parallel or in series to deliver the heat exchange medium to each of the reactor modular units. In some embodiments where a catalytic combustion system includes reactor modular units assembled in stacks, the conduit is configured such that heat exchange medium is introduced through a conduit inlet located at a bottom portion of the modular reactor, and exits through a conduit outlet located at a top portion of the modular reactor. A conduit outlet of a first stacked modular reactor is in fluid connection with a conduit inlet of a second stacked modular reactor. In this manner, the number of reactor modular units in a catalytic combustion system can be altered based on a desired output of heat exchange medium from the topmost reactor modular unit.

In some embodiments, the reactor described herein includes a plurality of heating elements, each with a plurality of plates. In some embodiments, the reactor described herein includes a modular heating element, each modular unit having a plurality of plates Heat Exchange In known heat exchangers, a hot medium is typically provided inside a conduit and surrounded by a cold medium to transfer heat from the hot medium to the cold medium. To maximize fuel combustion and at the same time maximize heat transfer, improved reactors and catalytic surfaces are developed as described herein, which are more efficient when a cold medium (i.e. the heat exchange medium) is provided inside a conduit surrounded by a hot medium (i.e. heating element coated with the catalyst composition).

Furthermore when initially starting up a heat exchanger, early heat loss due to conductive transfer of heat to the heat exchange medium can decrease the effectiveness of the heating element having the catalytic composition applied thereon from initiating combustion. To avoid significant delay or slow initial temperature increase, the reactors described herein also has the advantage of more effectively managing this early heat loss during start up, by interweaving the conduit between the plates and looping the conduit beyond the width of the plates such that the loop portion is not in contact of the plates.

Figure 4:
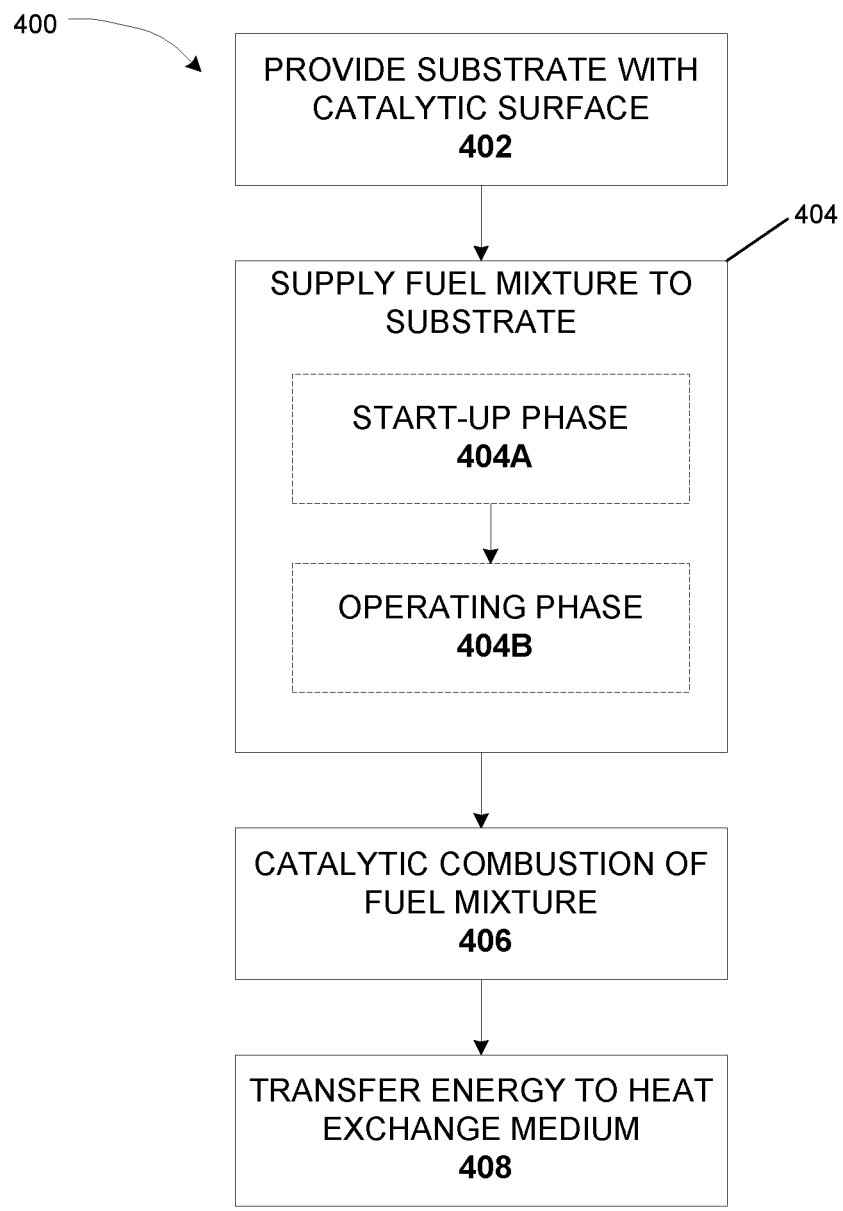
FIG. 4 is a block diagram illustrating a process for heating a heat exchange medium according to an embodiment of the invention.

In an aspect, there is provided a method 400 for heating a heat exchange medium as shown in FIG. 4. At 402, a catalytic surface comprising a hydrogen oxidation catalyst (HOC) and an oxygen reduction catalyst (ORC). The catalytic surface is adapted to lower the activation energy of a combustion of a fuel mixture comprising a fuel and an oxidizer such that the combustion occurs at low temperatures. At 404, the fuel mixture is supplied to the catalytic surface. At 406, the fuel mixture is combusted on the catalytic surface. At 408, the heat generated by the catalytic combustion is transferred to a heat exchange medium.

In some embodiments, the HOC and the ORC are present in a ratio of between about 9:1 and about 4:1 by surface area. In some embodiments, the HOC and the ORC are present in a ratio of about 20:3.

In some embodiments, the fuel mixture includes a fuel and an oxidizer. In some embodiments, the fuel includes hydrogen, a hydrocarbon material, or a mixture thereof. In some embodiments, the hydrocarbon material is a renewable hydrocarbon material, such as biodiesel, biogas, or algae fuel. In some embodiments, the fuel is hydrogen. In some embodiments, the oxidizer includes oxygen, oxygen-enriched air or air. In some embodiments, the oxidizer is oxygen.

In some embodiments, combustion products of the catalytic combustion include water. Accumulation of water on the catalytic surface reduces the surface available to catalyze the combustion of the fuel mixture. In some embodiments, the catalytic combustion occurs at a low pressure. Lower pressures may decrease the boiling point of the water. The lowered boiling point may decrease the accumulation liquid water on the catalytic surface by increasing the rate of vaporization of the water.

In some embodiments, the supplying of the fuel mixture includes modulating the composition of the fuel mixture. In some embodiments, the supplying of the fuel mixture includes a start-up phase 404A, an operating phase 404B or both.

During the start-up phase 404A, the catalytic surface is disposed at an initial temperature. In some embodiments, the initial temperature of the catalyst surface is below 100° C., 50° C., 30° C., 20° C., 15° C., or even below 10° C. In some embodiments, the composition of the fuel mixture provided during the start-up phase 404A is relatively oxygen-rich. A relatively oxygen-rich fuel mixture may undergo catalytic combustion at a lower temperature than a fuel-rich mixture. In some embodiments, the ratio of oxygen to fuel of the fuel mixture supplied during the start-up phase is between about 1:2 to about 1:1. In some embodiments, the ratio of oxygen to fuel of the fuel mixture supplied during the start-up phase is about 11:14. The catalytic combustion effects heating of the catalytic surface. In some embodiments, the start-up phase lasts for up to one hour, 45 minutes, 30 minutes, or even 20 minutes.

Figure 7:
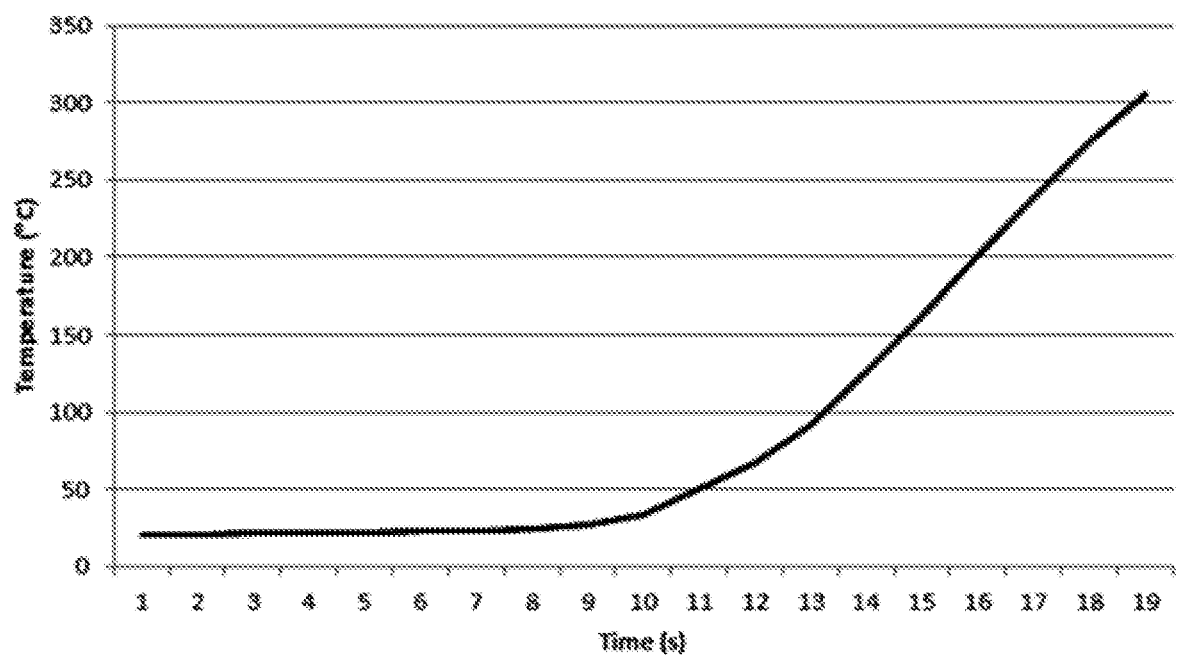
FIG. 7 is a plot showing the temperature of a system operated according to a method according to an embodiment of the invention.

Having reference to FIG. 7, in a particular embodiment of the invention, a fuel mixture was supplied to a reactor. The initial temperature of was ambient temperature (approximately 25° C.). The temperature rose slowly for about 10 seconds until it reached approximately 35° C., at which point the temperature started increasingly more rapidly. Without wishing to be bound by theory, it is believed that at the initial temperature, the energy was sufficient to activate the reaction, but at relatively low reaction rates. As the reaction proceeded, energy was released by the exothermic catalytic combustion reaction. This resulted in the observed increase in temperature and provided additional energy, which increased reaction rates and led to faster increases in the temperature. In contrast, in a system fed the same fuel mixture, but where palladium was the sole catalytic material in a similar heating element, there was no observed increase in temperature over ambient temperatures, even after a period of more than one hour.

In some embodiments, once the temperature of the catalytic surface exceeds about 140° C. the process enters an operating phase 404B. In some embodiments, the composition of the fuel mixture is relatively fuel-rich. In some embodiments, catalytic combustion with a relatively fuel-rich fuel mixture may occur at higher operating temperatures as no excess oxidizer is present to act as a thermal diluent. In some embodiments, the ratio of oxygen to fuel of the fuel mixture supplied during the operating phase is between about 2:5 and about 2:3. In some embodiments, the ratio of oxygen to fuel of the fuel mixture supplied during the operating phase is about 3:4. In some embodiments, the catalytic combustion during the operating phase occurs on the catalytic surface having an operating temperature of higher than 300° C., 400° C., 500° C., or even 600° C. In some embodiments, the operating temperature is higher than 600° C. Higher catalytic surface temperatures result in a greater thermal gradient with the heat exchange medium, thereby increasing the amount of heat transferred to the heat exchange medium.

In some embodiments, the fuel mixture has limited or no thermal diluent. For example, air is a mixture of gases including nitrogen, oxygen, and carbon dioxide. The non-oxygen gases in air have limited reactivity and may act as thermal diluents absorbing some of the heat released by catalytic combustion such that the temperatures that can be achieved by the catalytic combustion of the fuel mixture is lower than when the fuel mixture includes limited or no thermal diluent. Further, at high operating temperatures, the presence of nitrogen can result in the formation of undesirable $NO_x$. As such, in some embodiments, the oxidizer is oxygen-enriched air, or oxygen. In some embodiments, the oxidizer is oxygen.

In some embodiments, the catalytic combustion is effected at a pressure lower than atmospheric. In some embodiments, the catalytic combustion is effected at a pressure of less than 100 kPa, 90 kPa, 80 kPa, 70 kPa, 60 kPa, or even less than 50 kPa. At pressures lower than atmospheric pressures, the boiling point of water is lowered, thereby reducing the likelihood of the accumulation of liquid water on the catalytic surface. Further, at lower pressures, the combustibility of the bulk fuel mixture may be reduced, which may result in greater safety.

In some embodiments, the heat exchange medium is water, convectionally cooled helium loop, $sCO_2$ (superheated carbon dioxide). In some embodiments, the transfer of the heat to the water results in the formation of steam. Steam may be used, for example, to drive turbines, to provide energy for district heating systems, or in desalination operations.

In some embodiments, the catalytic surface is at least a portion of the surface of a heating element of the heat exchanger described above. In some embodiments, the catalytic surface is prepared according a method as described above. In some embodiments, the catalytic surface includes a catalyst composition as described above.

In an aspect, there is provided a catalytic combustor. The catalytic combustor includes a catalytic surface. The catalytic surface includes a catalytic composition as described above or is prepared by a process as described above.

In some embodiments, the heat generated by the operation of the catalytic combustor is used as a heat source to effect work. In some embodiments, the heat generated by the operation of the catalytic combustor is used to drive a Stirling Engine, a turbine, a phase change operation for air conditioning, a district heating system, or a desalination system. For example, in some embodiments, the catalytic combustor is a heating element incorporated into reactor 300. In another embodiment, the catalytic combustor is a graphite block having a hole adapted to receive a expansion cylinder of a Stirling engine. In some embodiments, the heat generated by the operation of the catalytic combustor is used to generate steam. For example, the catalytic combustor may be integrated into a reactor as described above.

In an aspect, there is provided a method for catalytically combusting a fuel mixture. A fuel mixture including a fuel and an oxidizer is supplied to a catalytic combustor as described above and catalytically combusted on the catalytic surface of the catalytic combustor. In some embodiments, the catalytic combustion is effected similarly to the heating of a heat exchange medium as described above except that the heat is not necessarily transferred to the heat exchange medium.

EXAMPLES

Example 1—Preparation of a Catalyst Composition

A disc was cut from 316 stainless steel sheet having a thickness of 0.8 mm. Mounting holes were drilled into the disc. The surface of the disc was mechanically roughened to an ISO roughness Grade N10 using carborundum paper having progressively finer grits from 30 through 800.

An HOC electroplating solution was prepared by dissolving 1 g of PdCl in 800 mL of 30% ammonia. The disc and a palladium electrode of similar area were mechanically suspended in the solution and an electrical current of 1 A at 30 V was applied for 15 minutes. The objective was to obtain a uniform coverage of palladium approximately 250 µm in thickness.

Once the plating was complete the disc was removed, rinsed with distilled water and gently patted dry with a delicate task wiper to remove excess remaining liquid. The disc was then baked in an industrial furnace at 100° C. for approximately 15 minutes to remove residual electroplating solution.

A visual inspection of the surface was performed to confirm that a uniform coating was applied with no visible substrate. If the coverage was marginal, a multi-point SEM/EDX inspection was performed. The electroplating process was repeated if required.

Once coverage was confirmed, the disc was annealed at 900° C. for 1 hour and then allowed to cool to room temperature.

An ORC electroplating solution was prepared by dissolving 1 g of $SnO_2$ in 800 mL of 32% HCl.

The cooled disk was mechanically suspended in the ORC electroplating solution and an electrical current of 10V at 3 A was applied across the disc and a palladium electrode of similar dimensions for 7 minutes.

Once the ORC electroplating was complete, the disc was removed and rinsed with distilled water. The inspection process was repeated to confirm whether the electroplating deposited tin to at least 30% of the surface.

When the coverage was confirmed, the disc was annealed at 400° C. for 1 hour.

Figure 6A:
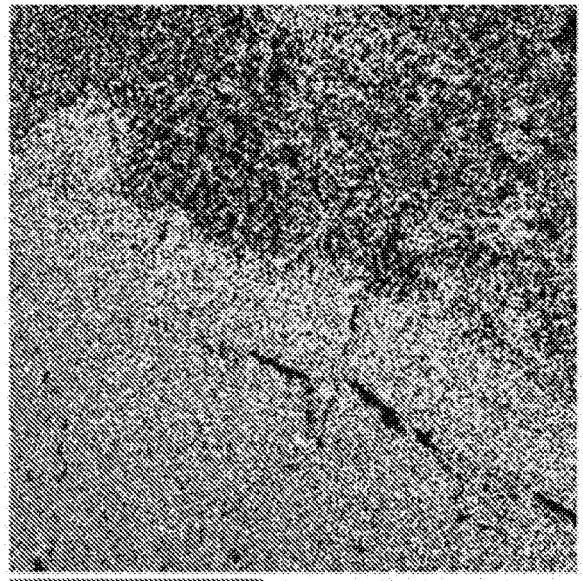
FIG. 6A is an SEM image showing the presence of palladium and tin on a substrate coated according to an embodiment of the invention.
Figure 6B:
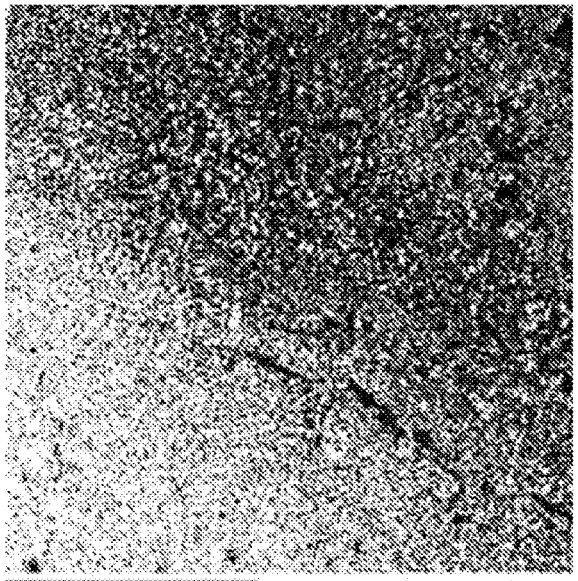
FIG. 6B is an SEM image showing the presence of palladium on a substrate coated according to an embodiment of the invention.
Figure 6C:
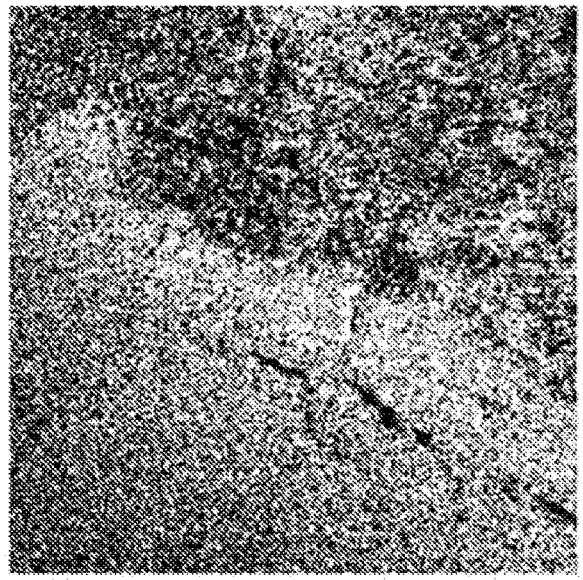
FIG. 6C is an SEM image showing the presence of palladium and tin on a substrate coated according to an embodiment of the invention.

An SEM/EDX image showing the catalyst composition as applied to a substrate is provided at FIGS. 6A-C. The settings used to obtain the image were as follows:

Acc. Voltage: 15.0 kV
Resolution: 512×512 pixels
Viewed Resolution: 50%
Process Time: 5
Image Width: 1.567 mm
Mixed Map: Palladium La1 (red), Tin La1 (green).

Example 2—Catalytic Combustion with the Catalytic Composition

A reactor having a catalytic composition applied to a heater disposed therein, as shown in FIG. 3 was used. The system was run such that the conduit received water and the shell received the fuel mixture.

The system was primed with water from a tank using a pump until it flowed out of the steam/water outlet through an open valve. The water subsystem outlet valve was then closed. The pressure in the internal environment of the shell was lowered to obtain a vacuum of about 2 kPa(a). Hydrogen and oxygen were then introduced to the internal cavity though a regulator and controlled with a mass flow controller. The flow was initially set to deliver the hydrogen and oxygen in a ratio of about 14:11. A series of thermocouples were used to monitor internal and external temperatures.

Having reference to FIG. 7, the internal temperature was initially about 25° C. For approximately 10 seconds, there was a relatively slow initial temperature increase. At a temperature of between approximately 40° C. and 60° C., the rate of temperature increase accelerated significantly. The temperature leveled off at between approximately 350° C. and 400° C.

The water was circulated into the subsystem and the steam pressure was controlled by opening the output valve to maintain a steam pressure of below 800 kPa.

The flow the fuel mixture was then adjusted to increase the amount of $H_2$ delivered and then the amount of $O_2$ delivered until the vacuum system is was longer able to maintain an internal pressure of below approximately 100 kPa(a).

The temperature increased to approximately 600° C. and high quality steam was produced.

Example 3—Catalytic Combustion with the Catalytic Composition Applied on Corrugated Heating Plates A reactor having a catalytic composition applied to a plurality of corrugated plates disposed therein, as shown in FIG. 8, was used. The system was run such that the conduit receives water, and the shell receives hydrogen and oxygen through two separate inlets. The system was primed with water, and hydrogen and oxygen were introduced to the internal cavity in similar manner as described in Example 2 above.

The internal temperature was initially about 11° C. (data not shown), and the system exhibited a temperature increase profile or trend similar to that shown in FIG. 7 producing high quality steam.

While a number of exemplary aspects and embodiments have been discussed above, those of skill in the art will recognize certain modifications, permutations, additions and sub-combinations thereof are possible. In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

What is claimed is:

1. A catalyst composition comprising:
    a continuous phase comprising a hydrogen oxidation catalyst (HOC); and
    a discontinuous phase comprising an oxygen reduction catalyst (ORC);
    wherein the catalyst composition catalyzes a hydrogen combustion reaction at a temperature of below about 140° C.;
    wherein the discontinuous phase has a total interfacial perimeter and a total amount of the ORC; and
    wherein the ratio of a surface area of the HOC to a surface area of the ORC is between about 9:1 and about 4:1.

2. The catalyst composition of claim 1, wherein the ratio of the surface area of the HOC to the surface area of the ORC is about 20:3.

3. The catalyst composition of claim 1, wherein the HOC and the ORC are formed by electrodeposition.

4. The catalyst composition of claim 1, wherein the catalyst is catalyzes hydrogen combustion at a temperature of below 20° C.

5. The catalyst composition of claim 1, wherein the HOC is a noble metal.

6. The catalyst composition of claim 5, wherein the HOC is platinum or palladium.

7. The catalyst composition of claim 6, wherein the HOC is palladium.

8. The catalyst composition of claim 1, wherein the ORC is iron, zinc, silver, copper, tin, oxides thereof, or combinations thereof.

9. The catalyst composition of claim 8, wherein the ORC is stannous oxide.

10. A process for applying a catalyst composition comprising:
    providing a substrate;
    applying a catalyst composition to the substrate to form a catalytic surface, wherein the catalyst composition comprises a continuous phase comprising a hydrogen oxidation catalyst (HOC) and a discontinuous phase comprising an oxygen reduction catalyst (ORC);
    wherein the catalytic surface catalyzes a hydrogen combustion reaction at a temperature of below about 140° C.;
    wherein the discontinuous phase has a total interfacial perimeter and a total amount of the ORC; and
    wherein the catalytic surface includes an HOC surface area and an ORC surface area having a ratio of between about 9:1 and about 4:1.

11. The process of claim 10, wherein the ratio of the HOC area to the ORC area is about 20:3.

12. The process of claim 10, wherein the applying of the catalyst composition comprises applying of the HOC and applying of the ORC.

13. The process of claim 12, wherein ORC is applied after applying of the HOC.

14. The process of claim 10, wherein the applying of the catalyst composition includes electroplating the HOC, the ORC, or both to the substrate.

15. The process of claim 14, wherein applying of the catalyst composition includes electroplating the HOC to the substrate.

16. The process of claim 15, wherein applying of the catalyst composition includes electroplating the ORC to the HOC-applied substrate.

17. The process of claim 10, further comprising applying a precursor to the substrate prior to applying the catalyst composition, wherein the precursor enhances adhesion of the catalyst composition to the substrate.

18. The process of claim 17, wherein the precursor is nickel or copper.

19. The process of claim 17, wherein applying the precursor includes electroplating the precursor to the substrate.

20. The process of claim 10, further comprising heating treatment of the catalyst-applied substrate.

21. A reactor apparatus comprising:
a heating element comprising a plurality of plates, each plate comprising a catalytic surface having the catalyst composition of claim 1 applied thereon, the catalyst composition for catalytically combusting a fuel; and
a conduit in contact with the plurality of plates, the conduit including:
an inlet for receiving a heat exchange medium, and
an outlet; and
a shell surrounding the conduit and the heating element, the shell having one or more inlets for receiving the fuel and an oxidizer;
wherein energy released by the catalytic combustion of the fuel is transferred to the heat exchange medium; and
wherein the catalyst composition lowers the activation energy of the combustion of the fuel such that the reaction occurs at a temperature of below about 140° C.

22. The reactor of claim 21, wherein the plurality of plates are stacked.

23. The reactor of claim 22, wherein one or more of the plurality of plates is corrugated.

24. The reactor of claim 21, wherein the conduit is positioned between two adjacent plates.

25. The reactor of 24, wherein the conduit weaves between the two adjacent plates.

26. The reactor of claim 21, further comprising a lumen or groove at a contact point between two adjacent plates, the lumen or groove for receiving the conduit.

27. The reactor of claim 21, wherein adjacent plates are spaced apart by a joint member.

28. The reactor of claim 27, wherein the joint member has a lumen or groove for receiving the conduit.

29. The reactor of claim 21, comprising a combustion cavity between two adjacent plates.

30. The reactor of claim 29, further comprising one or more distributor for distributing the fuel and the oxidizer to the combustion cavity proximate to the plurality of plates.

31. The reactor of claim 30, wherein the one or more distributor comprises a first distributor for distributing the fuel and a second distributor for distributing the oxidizer.

32. The reactor of claim 31, wherein mixing of the fuel and the oxidizer occurs in the combustion cavity.

33. The reactor of claim 21, wherein the catalytic surface includes an HOC area and an ORC area having a ratio of between about 9:1 and about 4:1.

34. The reactor of claim 33, wherein the ratio of the HOC area to the ORC area is about 20:3.

35. The reactor of claim 21, further comprising a preheater upstream of and in thermal contact with the reactor, for preheating the heat exchange medium or the fuel.

36. The reactor of claim 21, wherein the heat exchange medium comprises water.

37. The reactor of claim 36, wherein transfer of energy to the water effects vaporization to produce steam.

38. The reactor of claim 21, wherein the heating element is modular.

39. A catalytic combustion system comprising one or more of the reactor as defined in claim 21.

* * * * *

UNITED STATES PATENT AND TRADEMARK OFFICE
CERTIFICATE OF CORRECTION

PATENT NO. : 11,559,787 B2
APPLICATION NO. : 16/641439
DATED : January 24, 2023
INVENTOR(S) : Steven James Heaton and Samuel James Kirk It is certified that error appears in the above-identified patent and that said Letters Patent is hereby corrected as shown below:

In the Claims

In Claim 4, Column 20, Line 29, delete "catalyst is catalyzes" and insert --catalyst catalyzes-- therefor.

In Claim 25, Column 22, Line 3, delete "The reactor of 24," and insert --The reactor of claim 24,-- therefor.

Signed and Sealed this
Seventh Day of March, 2023

Katherine Kelly Vidal
*Director of the United States Patent and Trademark Office*